United States Patent
Hammes et al.

(10) Patent No.: US 7,567,626 B2
(45) Date of Patent: Jul. 28, 2009

(54) RADIO RECEIVER FOR THE RECEPTION OF DATA BURSTS WHICH ARE MODULATED WITH TWO MODULATION TYPES

(75) Inventors: Markus Hammes, Dinslaken (DE); Giuseppe Li Puma, Bochum (DE)

(73) Assignee: Infineon Technologies AG, Munich (DE)

( * ) Notice: Subject to any disclaimer, the term of this patent is extended or adjusted under 35 U.S.C. 154(b) by 615 days.

(21) Appl. No.: 11/261,008

(22) Filed: Oct. 28, 2005

(65) Prior Publication Data

US 2006/0116091 A1    Jun. 1, 2006

(30) Foreign Application Priority Data

Nov. 2, 2004    (DE) .................... 10 2004 052 897

(51) Int. Cl.
*H03K 9/00*    (2006.01)
(52) U.S. Cl. .................... 375/316; 375/323; 375/322; 375/329; 375/334; 370/468
(58) Field of Classification Search ............. 375/232, 375/316, 329, 323; 370/468
See application file for complete search history.

(56) References Cited

U.S. PATENT DOCUMENTS

| | | | |
|---|---|---|---|
| 7,227,874 B2* | 6/2007 | Kim et al. | 370/468 |
| 7,376,180 B2* | 5/2008 | Feher | 375/232 |
| 2001/0022805 A1 | 9/2001 | Dabak et al. | |

FOREIGN PATENT DOCUMENTS

| | | |
|---|---|---|
| DE | 199 48 899 A1 | 4/2001 |
| EP | 0901257 B1 | 8/1998 |
| EP | 0977459 A2 | 7/1999 |
| EP | 1 484 880 A2 | 12/2004 |
| EP | 0881806 B1 | 2/2005 |

\* cited by examiner

*Primary Examiner*—Sudhanshu C Pathak
(74) *Attorney, Agent, or Firm*—Eschweiler & Associates, LLC

(57) ABSTRACT

The invention relates to a radio receiver for the reception of a data burst which is transmitted by a transmitter, in which case the data burst includes a first section which has been modulated using a first modulation method at the transmitter end, and a second section which is transmitted after the first section and has been modulated using a second modulation method at the transmitter end. The radio receiver has a first reception path for processing of the first section and a second reception path for processing of the second section.

16 Claims, 2 Drawing Sheets

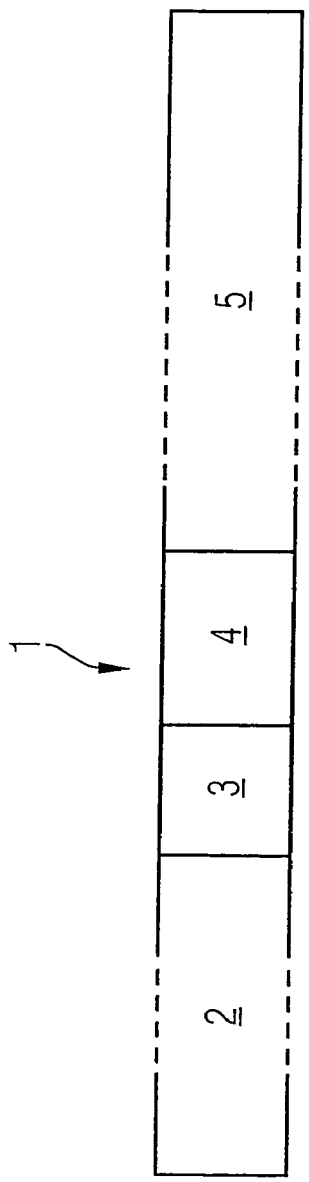
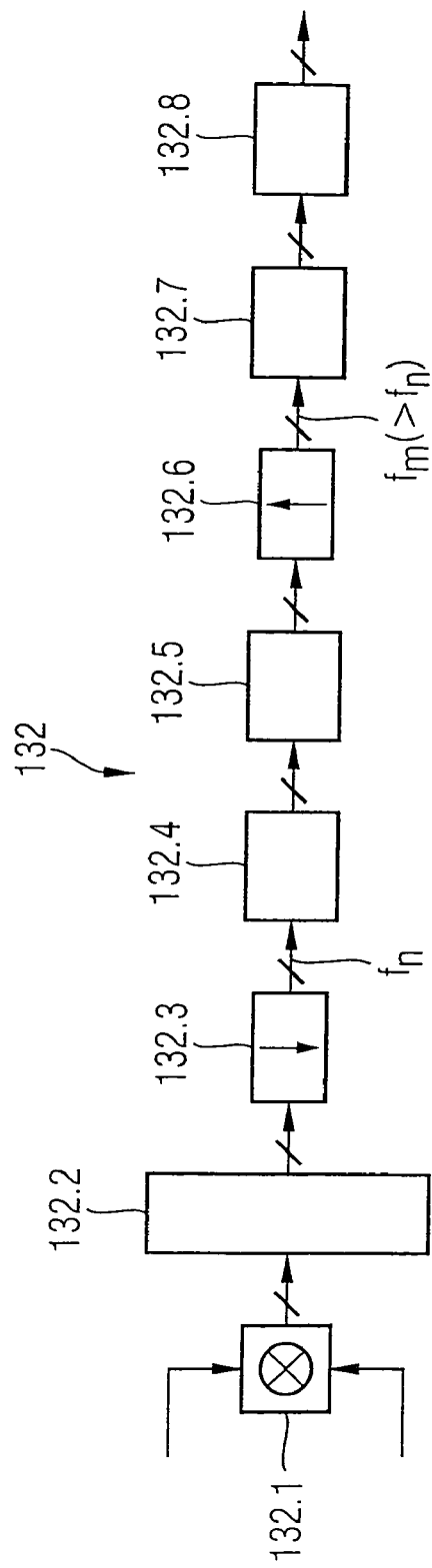

RADIO RECEIVER FOR THE RECEPTION OF DATA BURSTS WHICH ARE MODULATED WITH TWO MODULATION TYPES

REFERENCE TO RELATED APPLICATIONS

This application claims the benefit of the priority date of German application DE 10 2004 052 897.7, filed on Nov. 2, 2004, the contents of which are herein incorporated by reference in their entirety.

FIELD OF THE INVENTION

The invention relates to a radio receiver which is designed for the reception of data bursts, in which the modulation type is changed within the data burst.

BACKGROUND OF THE INVENTION

Some mobile radio standards allow the modulation type to be changed during the transmission of a data burst. These mobile radio standards include, by way of example, the "Bluetooth Enhanced Data Rate" Standard. Owing to backwards compatibility, the start of a data burst, to be precise the preamble and the access code, is always (in this Standard) modulated as in the case of the Bluetooth Normal Rate using the GFSK (Gaussian Frequency Shift Keying) modulation method. At higher protocol layers, it is possible to negotiate switching to a higher-quality modulation method after the preamble and the access code, in order to increase the data rate.

While GFSK is a modulation method with a constant envelope, the higher-quality modulation methods which are switched to after successful negotiation to switch to the higher protocol layers may be modulation methods with a variable envelope. Such higher quality modulation methods include DQPSK (Differential Quadrature Phase Shift Keying), D8PSK (Differential Eight Phase Shift Keying) and QAM (Quadrature Amplitude Modulation). Signals which have been modulated using these modulation methods must be received by a linear receiver.

To date, receivers which have been designed to receive data bursts in which the modulation method is in some circumstances switched to a linear modulation method during the transmission have been designed on a linear basis. That part of the data burst which is modulated using a nonlinear modulation method is thus also received by the linear receiver. The greater complexity of linear receivers in comparison to GFSK receivers results in a higher power consumption than a pure GFSK receiver would require for this purpose.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a radio receiver for reception of data bursts in which the modulation type is changed during transmission, and which is distinguished by consuming less power than a linear receiver.

A radio receiver according to the invention is used for reception of a data burst that is transmitted from a transmitter. The data burst comprises a first section and a second section. The second section is transmitted after the first section. A first modulation method is used for modulation of the first section in the transmitter. The second section is modulated by means of a second modulation method at the transmitter end. It is, of course, assumed that the two modulation methods are not identical.

The radio receiver according to the invention has two reception paths for processing the received data burst. The first reception path processes the first section of the data burst, while the second reception path is used for processing the second section of the data burst. The first reception path may be formed from a conventional receiver which is configured to receive signals modulated using the first modulation method. In a corresponding manner, the second reception path is likewise a conventional receiver which is designed to process signals modulated using the second modulation method.

The different characteristics of the two modulation methods may result in the first reception path being less complex than the second reception path, and accordingly consuming less power. Since the second reception path is not required for the reception and processing of the first section, the power consumption of the radio receiver according to the invention is less than that of a conventional radio receiver whose single reception path is identical to the second reception path according to the invention.

Furthermore, the second reception path in the radio receiver according to the invention can be deactivated when only data bursts which have been modulated exclusively by means of the first modulation method are being received.

The following text describes how the advantages which result from the reduced power consumption outweigh the disadvantage of increased implementation complexity, which is associated with the provision of two reception paths.

The first modulation method is, in one example, a modulation method with a constant envelope, such as GFSK, while the second modulation method is a linear modulation method such as DQPSK, D8PSK or QAM.

The first and the second reception path are each configured for reception and processing of signals modulated in this way.

A conventional radio receiver would be a linear receiver in a situation such as this, in which at least a portion of the data burst is modulated using a linear modulation method. This receiver would also be used to process the first section, which, by way of example, is GFSK modulated. In contrast, the invention provides a GFSK receiver for the GFSK modulated first section, so that this section need not be processed by the linear receiver, which is intended for processing of the second section. Overall, this leads to a reduction in the power consumption of the radio receiver according to the invention.

According to one embodiment of the invention, a first common reception path is connected upstream of the first and the second reception path and, in particular, contains an analogue band selection filter. The joint use of the band selection filter considerably reduces the implementation complexity and the area occupied, since the band selection filter generally occupies a considerable area in the radio receiver.

A further reduction in the implementation complexity and area consumed is obtained in one example when a second common reception path is connected downstream from the first and the second reception path. The second common reception path advantageously contains a unit for clock recovery.

When the modulation type is changed, the bandwidth of the band selection filter must in some circumstances be changed owing to the different modulation spectra of GFSK and DPSK, even when the symbol rate remains unchanged. The band selection filter is configured in one example such that the transients which occur when switching the bandwidth decay during the so-called guard interval. The guard interval is a time interval which is provided between the transmission of the first and the second section of the data burst, during which no data transmission takes place.

One embodiment of the radio receiver according to the invention provides for the first reception path to have a limiting amplifier (limiter) which is followed by a discriminator, for conversion of analogue signals to digital signals. The second reception path in one example has an analogue/digital converter for the same purpose. A limiting amplifier with a downstream discriminator is distinguished by the fact that it consumes less power than a conventional analogue/digital converter. Furthermore, a limiting amplifier with a downstream discriminator results in less implementation complexity than a conventional analogue/digital converter. In addition, a limiter discriminator receiver architecture may be advantageous for channels with severe drops in reception level, for example, in the event of rapidly changing fading. In situations such as these, the automatic gain control (AGC) which controls the inputs of an analogue/digital converter may, in some circumstances, not react sufficiently quickly or the control range may not be wide enough, thus resulting in reduced reception quality.

It is advantageously possible according to the invention to provide for the second reception path to be in a standby mode for most of the time, and to be activated only on reception of a data burst. This measure on the one hand reduces the power consumption as far as possible, while on the other hand ensuring that the second reception path is ready to receive the second section of the data burst when the modulation type is changed. This measure also makes it possible for the automatic gain control (AGC) which is generally provided in a linear receiver to control the reception power in parallel with the reception of the GFSK-modulated data. The control process is in this case carried out by controlling the inputs of the analogue/digital converter for the second reception path. The gain settings obtained in this way can then be used for processing the DPSK modulated data since, in most cases, the power is the same for GFSK and DPSK, within certain tolerances.

Furthermore, it is particularly advantageous in one example for information which has been determined during the processing of the first section of the data burst to be transmitted to the second reception path. The information and parameters obtained from the first section can be used at least as start values for the second reception path. These include, for example, the reception power, the frequency offset and the sampling phase.

The radio transmission of the data burst is based in one example on the "Bluetooth Enhanced Data Rate" Standard.

The method according to the invention is used for processing a data burst which is received by radio and is characterized in that the modulation type is changed during the transmission of the data burst. The data burst accordingly has a first and a second section, in which the first section was modulated using a first modulation method at the transmitter end, and the second section was modulated using a second modulation method at the transmitter end. According to the invention, the two sections are processed separately from one another, and using different processing means. The first section is accordingly processed by means of a first reception path, and the second section is processed by means of a second reception path.

Since the method according to the invention corresponds to the radio receiver according to the invention as described above, the method according to the invention has the same advantages as the radio receiver according to the invention in comparison to conventional methods used for the same purpose.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text in an exemplary manner with reference to the drawings, in which:

FIG. 1 is a schematic diagram illustrating a data burst based on the "Bluetooth Enhanced Data Rate" standard;

FIG. 3 is a block diagram illustrating one example of the unit 132 shown in FIG. 2.

DETAILED DESCRIPTION OF THE INVENTION

Figure 2:
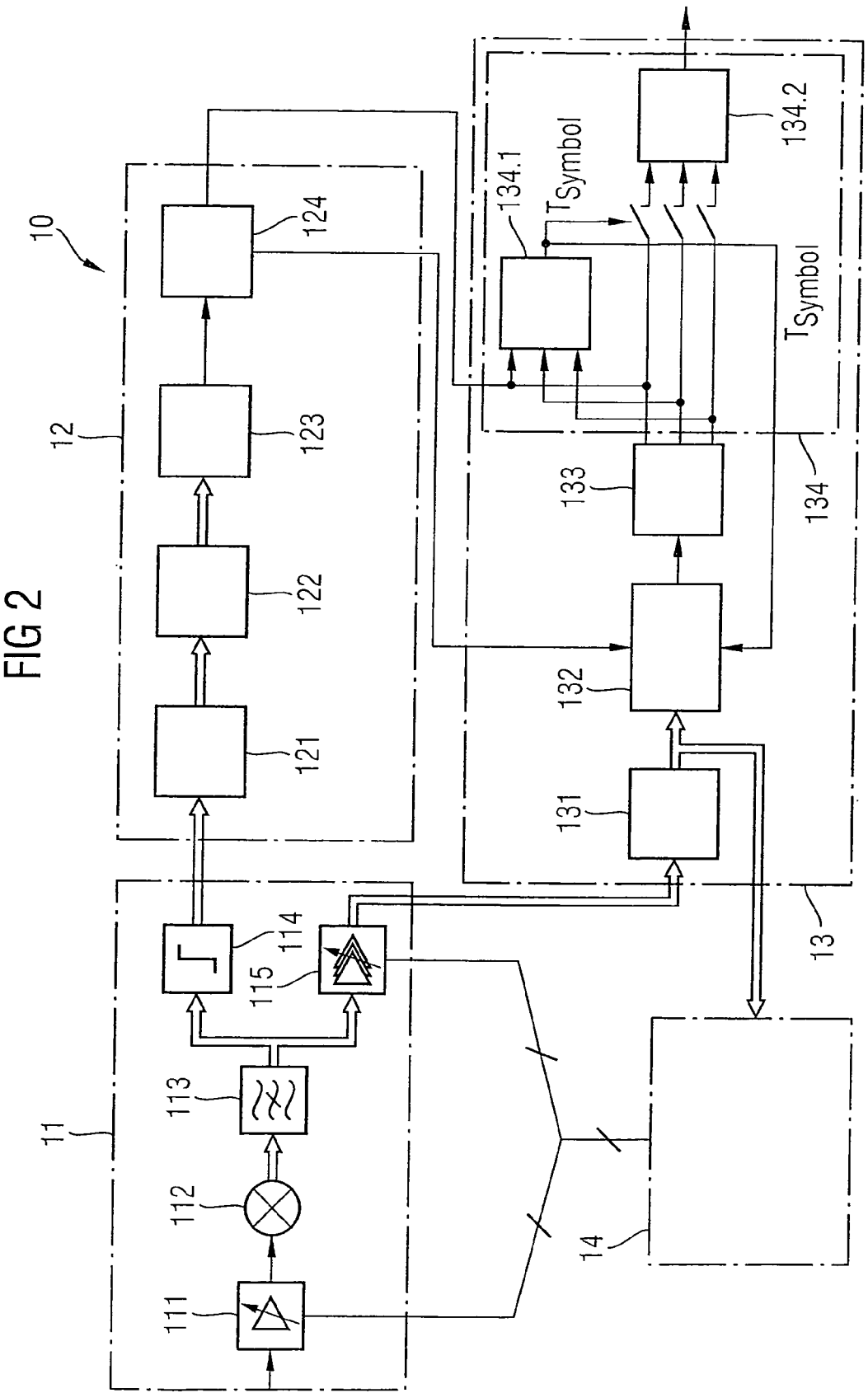
FIG. 2 is a block diagram illustrating a radio receiver according to one embodiment of the invention.

FIG. 1 shows, schematically, a data burst 1 in accordance with the "Bluetooth Enhanced Data Rate" Standard. This example Standard allows the modulation type to be changed within the data burst. The start 2 of the data burst, which comprises the preamble and the access code, is always modulated using the GFSK modulation method. A change can then be made to the M-DPSK linear modulation method (with multiple value symbols M=4 or 8). This change takes place during a so-called guard interval 3, during which no data transmission takes place. A synchronization sequence 4 and the payload data 5 are transmitted after the guard interval 3.

As one exemplary embodiment of the radio receiver according to the invention, FIG. 2 illustrates a radio receiver 10 which can be used to receive the data burst 1 as shown in FIG. 1. The radio receiver 10 comprises an analogue front-end stage 11, a GFSK receiving section 12, an M-DPSK receiving section 13 and a digital control unit 14.

The received radio-frequency signals are first of all passed to an LNA 111 in the analogue front-end stage 11. The radio-frequency signals which have been amplified by the LNA 111 are down-mixed by a mixer stage 112 to an intermediate frequency. The mixer stage 112 contains two individual mixers, which are driven via two orthogonal frequency signals. A complex signal is thus produced at the output of the mixer stage 112. The complex output signal at the mixer stage 112 is fed to a channel filter 113, which is in the form of a polyphase filter.

The output signal from the channel filter 113 is fed to two reception paths in the radio receiver 10. The first reception path, which extends to the GFSK receiving section 12, is used for processing of the GFSK-modulated part of the data burst 1 as shown in FIG. 1. The second reception path, the majority of which is located in the M-DPSK receiving section 13, processes the M-DPSK-modulated part of the data burst 1, when the modulation type is changed at the transmitter end.

The first reception path has a complex analogue/digital converter at the input end. The complex analogue/digital converter comprises a limiting amplifier (limiter) 114 and a sampling unit 121. The discrete-value signals which are continuous over time, produced by the limiting amplifier 114 are converted by the sampling unit 121 to digitized signals at discrete times. These signals then pass through a decimation and filter stage 122, a digital demodulator 123 and a unit 124 for frequency correction. The data emitted from the unit 124 is fed to a unit 134 for clock recovery. The unit 134 is arranged in the M-DPSK receiving section 13 in this example and will be explained further below.

The second reception path has a programmable amplifier 115 at its input. The programmable amplifier 115 controls the M-DPSK receiving section 13. On the input side, the M-DPSK receiving section 13 has an analogue/digital converter 131. The digitized signals from the analogue/digital converter 131 are passed to a unit 132.

The unit 132 is used for digital demodulation, for frequency correction and for phase readjustment, and one example of such a unit is illustrated in more detail in FIG. 3. The I and Q values digitized by the analogue/digital converter 131 are first of all fed to a mixer 132.1. The data then successively passes through an IQ interleaver 132.2, a decimator 132.3, a group delay equalizer 132.4, a matched filter 132.5, an oversampler 132.6, a unit 132.7 for phase determination, and a unit 132.8 for phase demapping and for frequency correction.

The unit 132 is followed by a decoder 133 for Gray decoding. The decoder 133 emits an oversampled bit data stream. This bit data stream is passed to the unit 134 for clock recovery. The unit 134 uses a unit 134.1 to determine the sampling phase of the data supplied to it, and then emits the data at the bit clock rate.

In the present exemplary embodiment of the radio receiver according to the invention, the unit 134 which is used for clock recovery is a component not only of the first reception path, which is designed for processing GFSK signals, but also of the second reception path, which is designed for processing M-DPSK signals. This measure allows the radio receiver 10 to be produced at as low a cost as possible.

The radio receiver 10 is also configured such that its specific parameters which are determined during the GFSK-modulated part of the data burst 1 can be used at least as start values for the processing of the M-DPSK-modulated part of the data burst 1. The data line illustrated between the units 124 and 132 in FIG. 2 is provided in order to transmit these parameters.

By way of example, the end of the GFSK-modulated part of the data burst 1 which, in the case of Bluetooth, has no DC component because of the sequences '1010' or '0101' in the trailer, is used to estimate the frequency offset. The frequency offset determined in this way can be passed as a digital value to the M-DPSK modulator. The sampling phase can also be determined in a similar way in the GFSK receiving section 12, and can be transmitted as a start value to the M-DPSK receiving section 13. Taking into account the time inaccuracies between the GFSK part and the M-DPSK part that are possible on the basis of the Bluetooth Standard, at least the synchronization window for the M-DPSK component can be derived here.

The present exemplary embodiment furthermore provides for the received power to be determined during the GFSK-modulated part of the data burst 1. For this purpose, the gain of the LNA 111 is first of all set roughly by means of a power detector. Fine adjustment can then be carried out on the basis of RSSI values. The RSSI values are determined by the digital control unit 14. In this case, the RSSI values are obtained from the output signal from the analogue/digital converter 131 which drives the digital M-DPSK demodulator. The digital control unit 14 sets the gain levels not only of the LNA 111 but also of the programmable amplifier 115.

The radio receiver also, in one example, has a control unit which is not illustrated in FIG. 2 that determines whether the data is obtained by means of the GFSK receiving section 12 or the M-DPSK receiving section 13.

As has already been explained above, the radio receiver according to the invention has the advantage that its power consumption is less than that of conventional radio receivers. The reduced power consumption does, however, involve increased implementation complexity. Nevertheless, as can be seen from the exemplary embodiment illustrated in FIG. 2, a relatively small number of additional components are required in comparison to a pure GFSK receiver in order to produce the radio receiver 10, since many components are not used only for processing GFSK-modulated signals but also for processing M-DPSK-modulated signals. Thus, in general, the disadvantage of additional implementation complexity associated with the invention is compensated for by the advantage of reduced power consumption.

In order to reduce the power consumption further, it is worthwhile operating that part of the radio receiver 10 which is used exclusively for processing of M-DPSK-modulated data in a standby mode, as much as possible. However, the relevant components should be activated again at the start of reception of a data burst 1, in order that they are then ready to operate immediately in the event of a possible change in the modulation type during the guard interval 3.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, the term "exemplary" as utilized herein merely means an example, rather than the best.

The invention claimed is:

1. A radio receiver for the reception of a data burst transmitted by a transmitter, wherein the data burst comprises a first section that has been modulated using a first modulation method, and a second section transmitted after the first section that has been modulated using a second modulation method, comprising:

a first reception path configured to process the first section of the data burst;

a second reception path configured to process the second section of the data burst;

a first common reception path connected upstream of the first reception path and the second reception path, the first common reception path comprising a band selection filter; and a second common reception path comprising a clock recovery unit connected downstream from the first reception path and the second reception path, wherein the clock recovery unit is configured to receive the processed first section from the first reception path and receive the processed second section from the second reception path, respectively, and determine a respective sampling phase in response thereto.

2. The radio receiver of claim 1, wherein the first modulation method is a modulation method with a constant envelope, and the second modulation method is a linear modulation method.

3. The radio receiver of claim 2, wherein the first reception path comprises a GFSK receiver, and the second reception path comprises a linear receiver.

4. The radio receiver of claim 1, wherein the data burst comprises a time interval during which no data transmission takes place, and wherein the time interval is provided between the first section and the second section of the data burst, and wherein the band selection filter is configured to switch the bandwidth thereof between the first section and the second section such that any transients caused by switching decay during the time interval during which there is no transmission.

5. The radio receiver of claim 1, wherein the first reception path comprises a limiting amplifier with a downstream discriminator, and the second reception path comprises an analogue/digital converter.

6. The radio receiver of claim 1, wherein the second reception path is activated during reception of a data burst.

7. The radio receiver of claim 1, wherein the first reception path further comprises a correction unit configured to determine one or more parameters associated with transmission of the data burst during processing of the first section of the data burst, and further configured to transmit the parameters to the second reception path.

8. The radio receiver of claim 1, wherein the data burst transmission is based on the "Bluetooth Enhanced Data Rate" Standard.

9. A method for processing a data burst received by radio, wherein the data burst comprises a first section that has been modulated using a first modulation method, and a second section transmitted after the first section that has been modulated using a second modulation method, comprising:

processing the first section of the data burst by a first reception path;

processing the second section of the data burst by a second reception path;

band selection filtering the data burst in a first common reception path connected upstream of the first reception path and the second reception path; and performing clock recovery for the processed first and second sections of the data burst in a second common reception path connected downstream from the first reception path and the second reception path, wherein a clock recovery component receives both the first processed section and the second processed section and performs the clock recovery based on the inputted first and second processed sections, respectively.

10. The method of claim 9, wherein the first modulation method is a modulation method with a constant envelope, and the second modulation method is a linear modulation method.

11. The method of claim 10, wherein the first reception path comprises a GFSK receiver and the second reception path comprises a linear receiver.

12. The method of claim 9, further comprising providing a time interval during which no data transmission takes place between the first section and the second section of the data burst, and wherein any transients that are caused by a change in the bandwidth of the band selection filtering between the first section and the second section decay during the time interval.

13. The method of claim 9, wherein the first reception path comprises a limiting amplifier with a downstream discriminator, and the second reception path comprises an analogue/digital converter.

14. The method of claim 9, further comprising activating the second reception path during reception of the data burst.

15. The method of claim 9, further comprising:

determining parameters in the first reception path during processing of the first section of the data burst; and transmitting the determined parameters to the second reception path.

16. The method of claim 9, wherein the transmission of the data burst is based on the "Bluetooth Enhanced Data Rate" Standard.

* * * * *